July 18, 1933.  B. P. SCHILTZ  1,918,290
METAL CUTTING MACHINE
Filed May 4, 1929   8 Sheets-Sheet 2
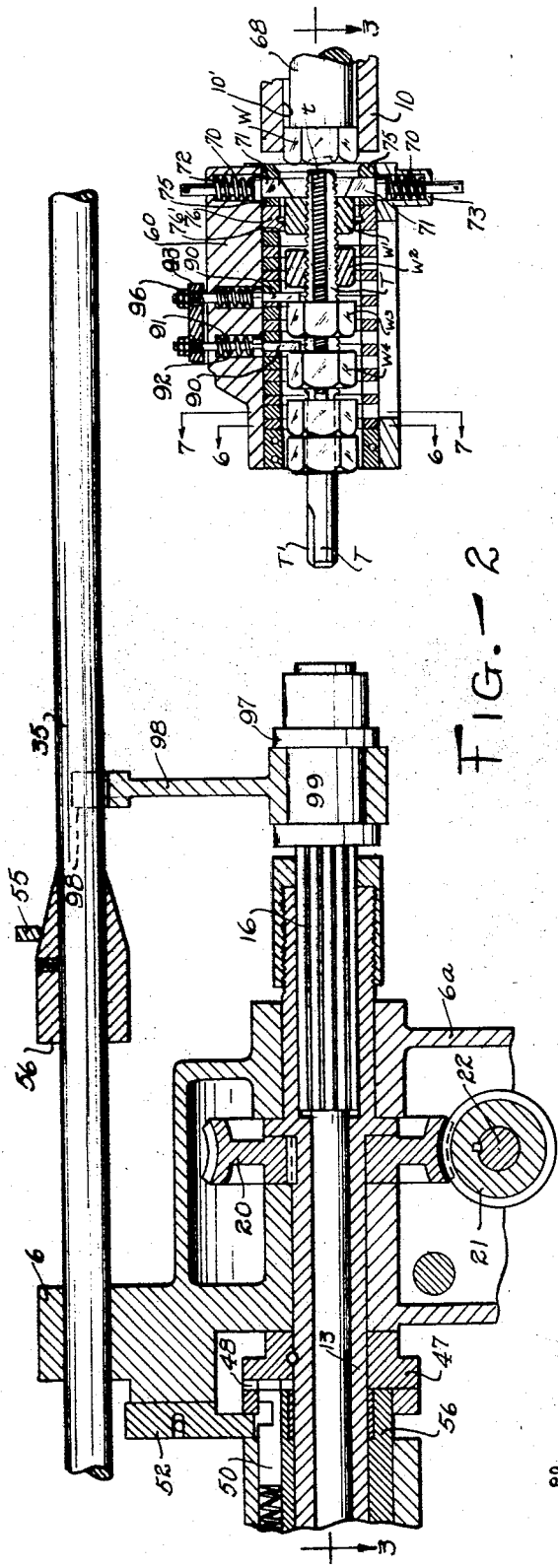
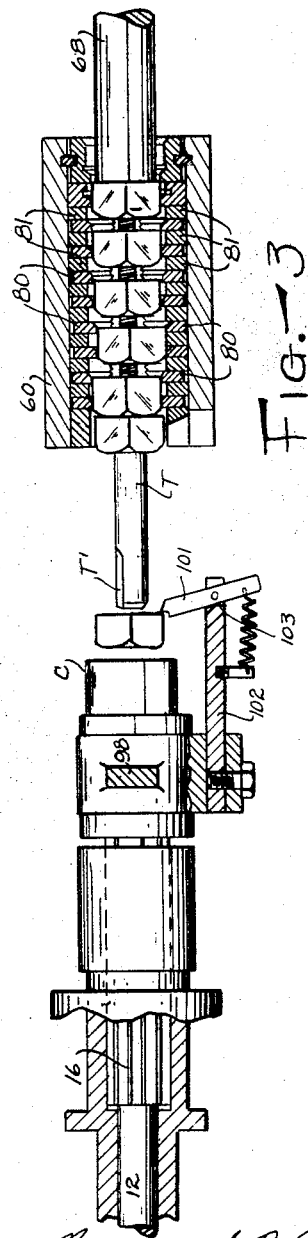

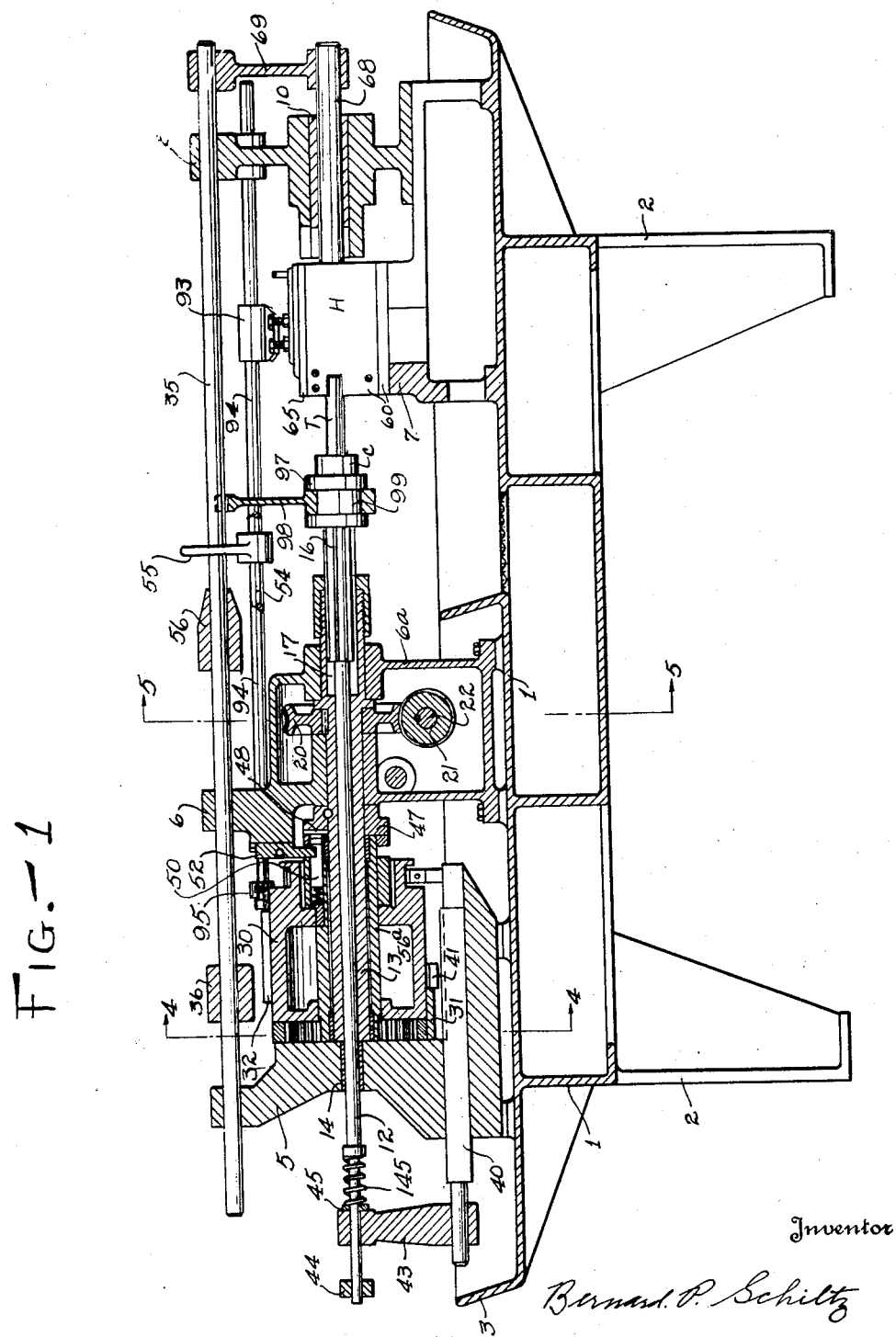

July 18, 1933.  B. P. SCHILTZ  1,918,290
METAL CUTTING MACHINE
Filed May 4, 1929  8 Sheets-Sheet 3

Inventor
Bernard P. Schiltz
By Bates, Golrick & Teare
Attorneys

July 18, 1933.  B. P. SCHILTZ  1,918,290
METAL CUTTING MACHINE
Filed May 4, 1929   8 Sheets-Sheet 4
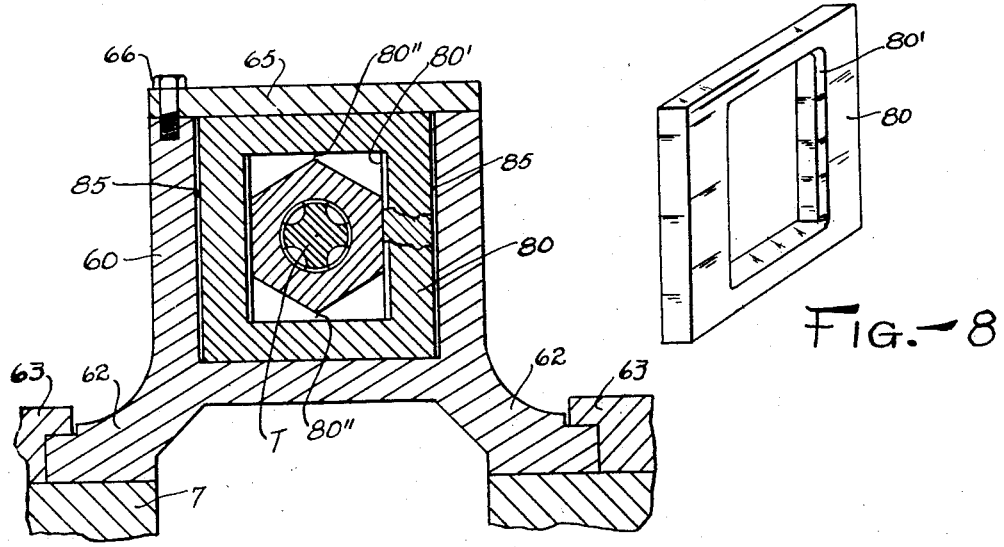
Fig.-6
Fig.-8
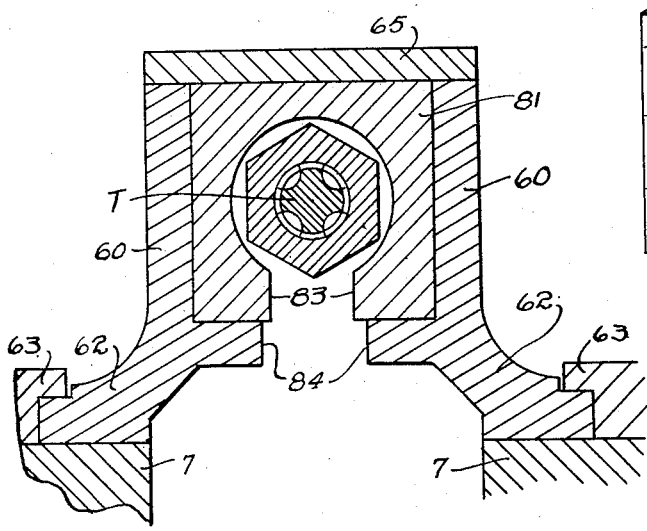
Fig.-7
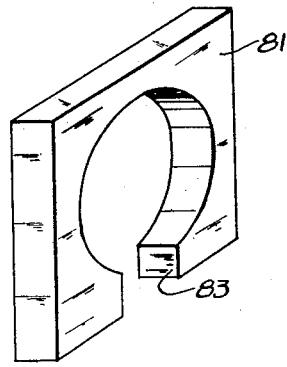
Fig.-9
Inventor
Bernard P. Schiltz
By Bates, Golrick & Teare
Attorneys July 18, 1933.  B. P. SCHILTZ  1,918,290
METAL CUTTING MACHINE
Filed May 4, 1929   8 Sheets-Sheet 5
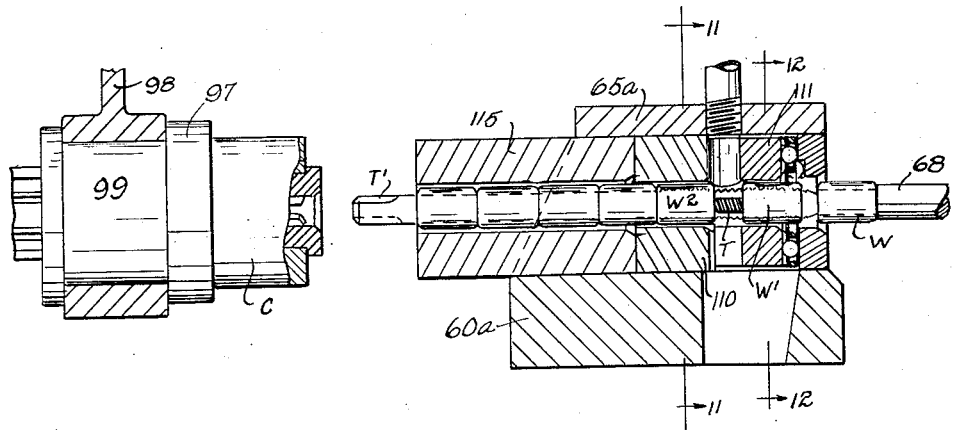
FIG.—10
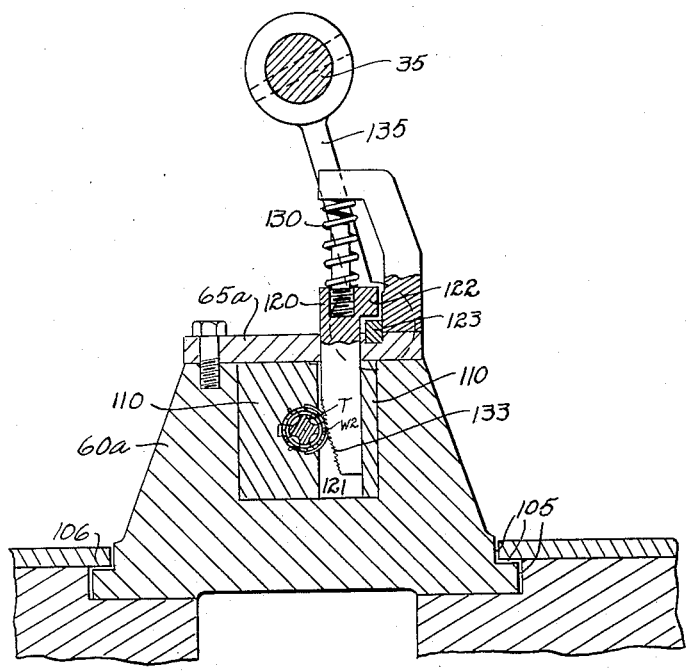
FIG.—11
Inventor
Bernard P. Schiltz
By Bates, Gohrick & Teare
Attorneys

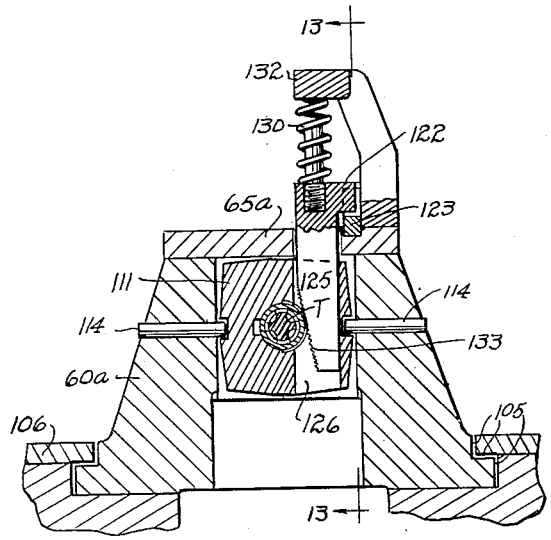
Fig.—12
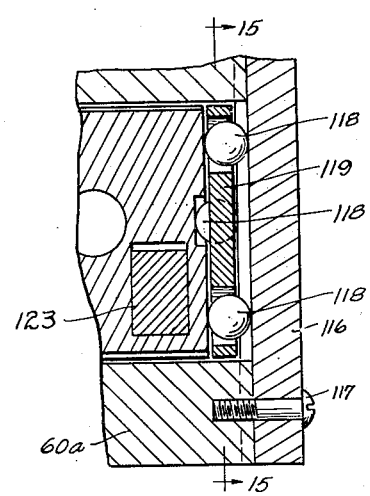
Fig.—14
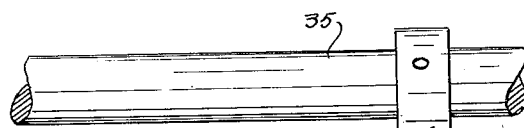
Fig.—13
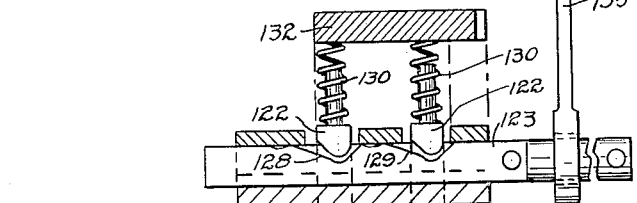
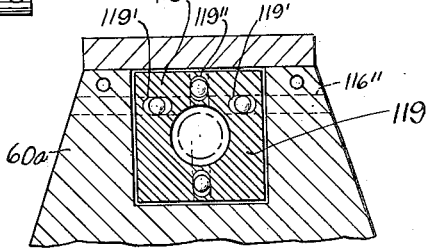
Fig.—15
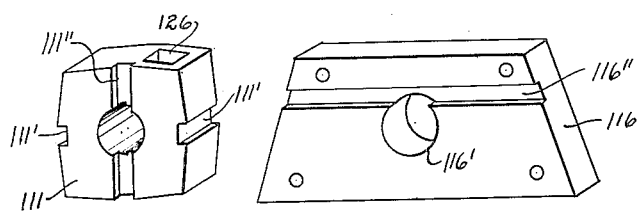
Fig.—16    Fig.—17

July 18, 1933.  B. P. SCHILTZ  1,918,290
METAL CUTTING MACHINE
Filed May 4, 1929   8 Sheets-Sheet 8
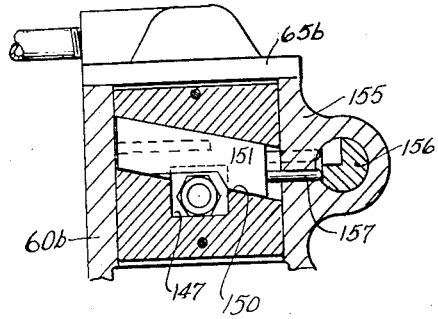
FIG.—23
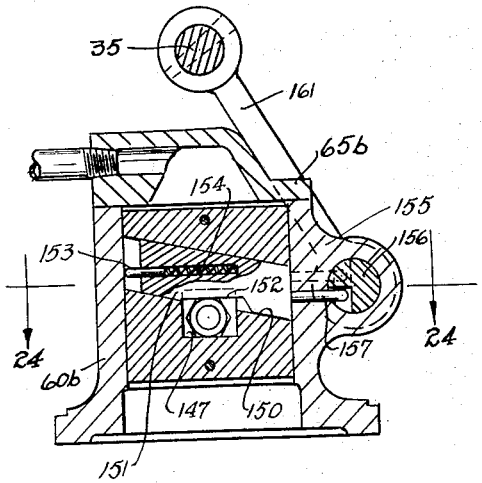
FIG.—22
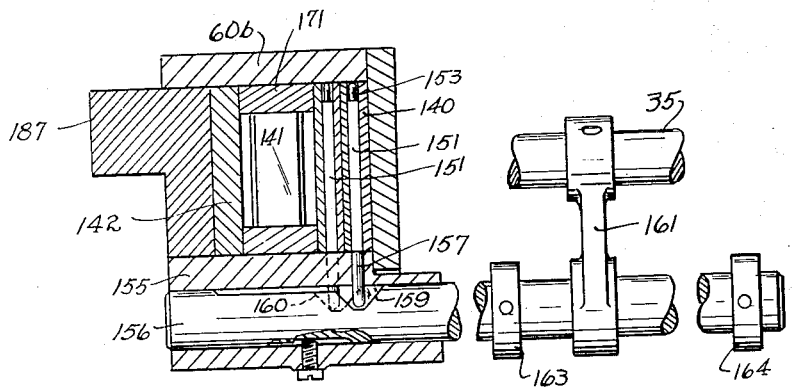
FIG.—24
Inventor
Bernard P. Schiltz
By Bates, Goliek & Teare
Attorneys Patented July 18, 1933

1,918,290

UNITED STATES PATENT OFFICE

BERNARD P. SCHILTZ, OF CLEVELAND, OHIO, ASSIGNOR TO THE FOOTE-BURT COMPANY, OF CLEVELAND, OHIO, A CORPORATION OF OHIO

METAL CUTTING MACHINE

Application filed May 4, 1929. Serial No. 360,399.

The general object of this invention is to provide mechanism in connection with a metal cutting machine by which apertured blanks of varying irregularity as to the relationship between the aperture and exterior surfaces of the blanks, may be uniformly machined or cut without danger to tool breakage.

An object is to provide an automatic tapping machine in which tap breakage may be substantially eliminated irrespective of high tapping speed and irregularities in the work to be tapped.

A specific object is to provide mechanism in connection with a holder for a plurality of apertured blanks adapted to be engaged by a tool at the same time, by which mechanism, tool breakage may be eliminated irrespective of varying eccentricity of the apertures in the blanks with relation to the outside surfaces of the blanks.

Still another object is to provide a tapping machine including a work holder, in which the work to be tapped shall be allowed comparatively free lateral floating movement relative to the tap axis, yet which work, regardless of general shape, will nevertheless be gripped securely to prevent turning thereof relative to the work holder.

Other objects and features of the invention will become apparent from the following description relating to the accompanying drawings which show various preferred embodiments. The essential characteristics are summarized in the claims.

Figure 4:
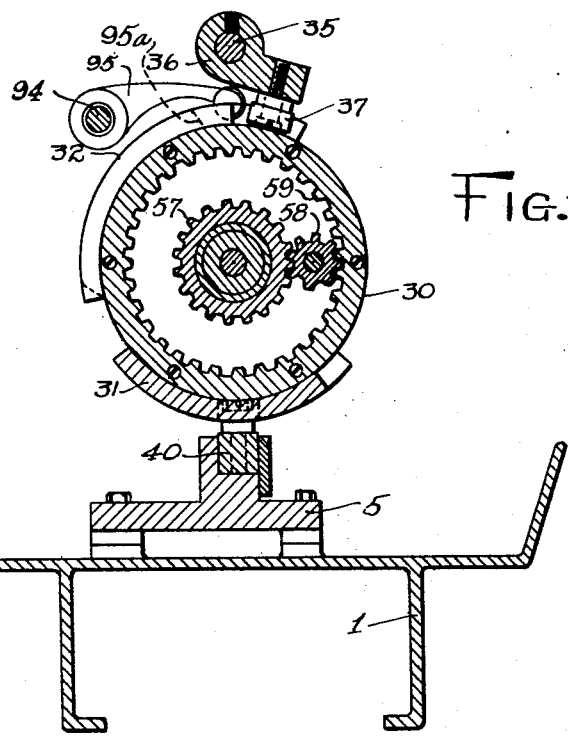
Figure 5:
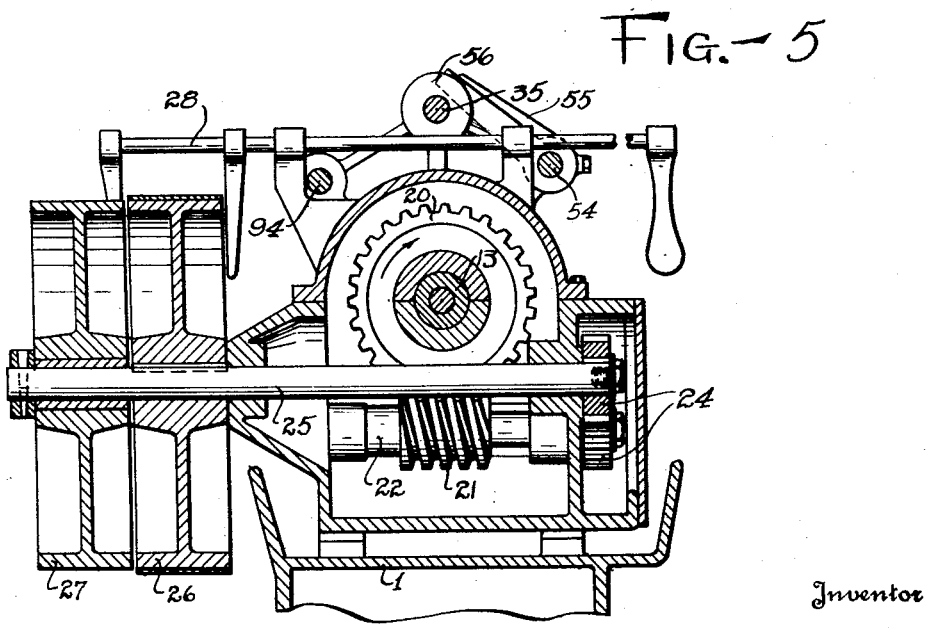

In the drawings, Fig. 1 is a substantially central longitudinal sectional view through a tapping machine of the character shown in the prior patent to Daniel Kelleher, No. 1,645,285, issued October 11, 1927; Figs. 2 and 3 are sectional detail views through one form of work holder and also show certain details of the tap driving mechanism; Figs. 4 and 5 are transverse sectional views through the machine taken substantially along the lines 4—4 and 5—5 respectively on Fig. 1; Figs. 6 and 7 are transverse sectional detail views taken substantially along the lines 6—6 and 7—7 on Fig. 2, and Figs. 8 and 9 are perspective views of parts of the work holder shown in Figs. 2, 6 and 7.

Figs. 10 and 11 are sectional detail views of a modified form of work holder adapted especially for comparatively cylindrical blanks, such as conduit couplings; Fig. 12 is a transverse sectional view of the arrangement shown in Fig. 10, taken substantially along the line 12—12 on Fig. 10; Fig. 13 is a fragmentary longitudinal sectional view, taken substantially along the line 13—13 on Fig. 12; Fig. 14 is a fragmentary sectional plan view, taken substantially along the line 14—14 on Fig. 13; Fig. 15 is a transverse cross sectional detail view, taken substantially along the lines 15—15 on Fig. 14, and Figs. 16 and 17 are perspective views of parts of the mechanism shown in Figs. 12 to 15 inclusive.

Figure 18:
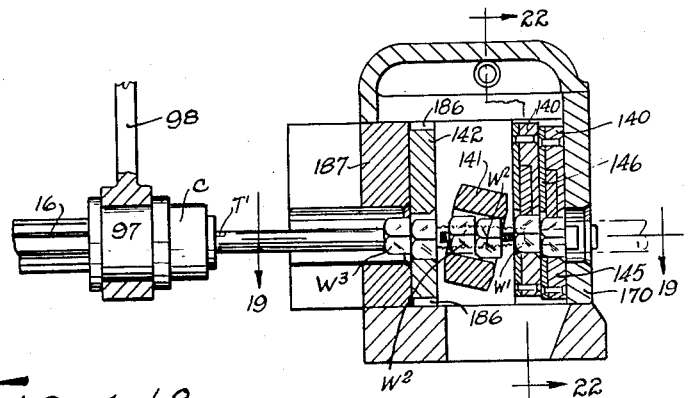
Figure 19:
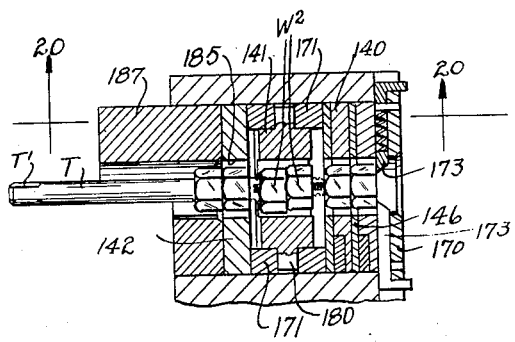
Figure 21:
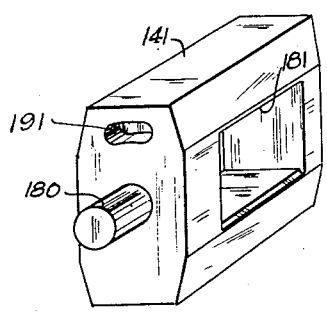
Figure 20:
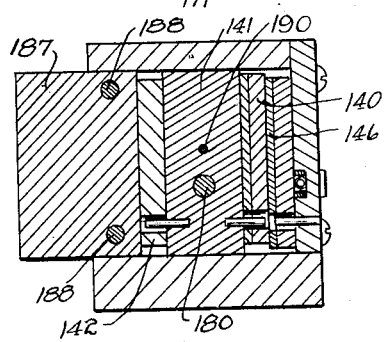

Fig. 18 is a fragmentary longitudinal cross sectional view on the order of Fig. 3 showing still other modifications with respect to the work holder; Fig. 19 is a fragmentary sectional plan view as indicated by the line 19—19 on Fig. 18; Fig. 20 is a longitudinal sectional view as indicated by the line 20—20 on Fig. 19; Fig. 21 is a perspective view of a pivoted work engaging and holding member, shown in Figs. 18 to 20; Fig. 22 is a transverse cross sectional detail of the work holder shown in Fig. 18, see line 22—22 on the latter figure; Fig. 23 is a sectional view similar to and showing the same parts as Fig. 22 but in different relation, and Fig. 24 is a fragmentary sectional plan view as indicated by the line 24—24 on Fig. 22.

In tapping machines for blanks, such as hexagonal nuts and cylindrical conduit couplings, tap breakage often results by reason of the fact that the apertures in the blanks are sometimes eccentric and variably so in the different blanks to be tapped. The difficulty is increased when such machines are speeded up for more rapid production. If a number of blanks are held fixedly in the bore of a work holder in substantial alignment and a tap caused to penetrate a number of such blanks, and further, if some of the openings are eccentric to the openings of others, the tap will obviously be subjected to excessive side strain. It is such side strain that causes the tap breakage. My invention contemplates overcoming the strain without adding greatly to the cost of the machine. I have shown my invention adapted to handle substantially cylindrical and hexagonal blanks, but it is to be understood that I also contemplate further modifications for other blank shapes where necessary. I will first describe the forms of the invention adapted for hexagonal blanks. These forms, incidentally, without any substantial change, will also handle square nut blanks.

Referring to Figs. 1 to 5, a suitable tapping machine essentially in accordance with the Kelleher patent above mentioned, will now be described. In these figures, 1 is a suitable bed having supporting legs 2, an oil pan 3 and various upwardly extending brackets rising from the bottom of the bed. As shown, there are brackets 5 and 6 supporting a spindle head of the machine, a bracket 7 supporting a work holder mechanism H and a bracket 8 for supporting the ends of control bars to be afterwards described, and also supporting a work feeding mechanism, including a hollow work receiving guide 10.

Rotatably carried by the brackets 5 and 6 is a spindle mechanism comprising a tap driving spindle 12 supported partly by a spindle sleeve 13 and partly by a bearing 14 in the bracket 5. The spindle 12 has at the working end of the machine, shown at the right in Fig. 1, a splined enlargement 16 engaging internal splines, not shown, in a longitudinal recess 17 in the sleeve, so that whenever the sleeve 13 is turned, the spindle 12 will likewise be turned.

For driving the spindle sleeve 13, a worm gear 20 may be keyed onto the sleeve within a hollow housing portion 6a of the bracket 6, and this may be suitably driven by a worm 21 on a worm shaft 22 supported beneath the worm gear in walls of the housing portion 6a, and the shaft may be turned by means of spur gearing 24, one element of which is fast on a shaft 25 shown as extending out of the housing and carrying fast and loose pulleys 26 and 27 respectively. The machine may be driven by a belt adapted to be shifted by mechanism, indicated generally at 28, from one pulley to the other.

The spindle sleeve 13 is drivingly connected to a master control cam drum, shown in Figs. 1 and 4 at 30. The cam has arcuate plates forming the cam members, two of which are shown at 31 and 32 and both become active during the rotation of the drum to shift a master control bar 35 running substantially the entire length of the machine and slidably carried on the brackets 5, 6 and 8.

The operating connections from the drum to the control bar 35 comprise a fixed arm 36 on the bar, having a cam follower roller 37 at its free end arranged to be engaged by diagonal faces of the respective cams 31 and 32. Upon part of each rotation of the cam drum, one of these faces causes the bar to be shifted to the left, as shown in Fig. 1, which movement feeds work into the work holder, to be presently described, and during part of the same rotation, the other cam becomes active to shift the bar in the opposite direction, namely, to the right from the position shown in Fig. 1, to prepare for feeding new work to the holder.

During each rotation of the drum 30, the spindle 12 is also shifted longitudinally of the machine to engage and disengage the tap, and this is by reason of a slide bar 40 mounted in the bracket 5 and carrying an upwardly facing roller 41 which is engaged by the cams 31 and 32 in sequence, in the same manner as the roller 37. One cam operates to shift the bar 40 to the left and the other cam operates to shift it to the right. The operative connection from the slide bar to the spindle, includes a tie arm 43 having its upper end acting between a rigid abutment 44 and a yielding abutment 45.

The drum is intermittently driven (a single rotation) by the constantly rotating spindle sleeve 13, upon completion of each tapping operation. The drive comprises a driving collar 47 keyed to the spindle sleeve 13 and having clutch teeth or notches, one of which is shown at 48 for engagement by a longitudinally shiftable clutch bar 50, the latter being carried around with a sleeve 56a, but which is normally held out of engagement with the clutch teeth by reason of a vertically sliding clutch controlling member 52. The controlling member operates in a suitable vertical slideway in the bracket 6, and is arranged to be raised and lowered by a transversely extending arm, not shown, on a rock shaft 54. The rock shaft has an arm at 55 which coacts with a conically shaped cam 56 on the control bar 55. Near the end of the right hand movement of the bar, this cam 56 raises the arm 55 and likewise the clutch control member 52 and allows the member 50 to engage the teeth 48. When this happens the sleeve 56 is carried around with the collar 47.

To cause the sleeve 56 to drive the drum, there is a geared connection between the sleeve and the drum. This comprises a spur gear 57 fixed on the sleeve 56, an idler 58 suitably supported on a stationary axis, and an internal gear 59 rigid with the drum. The arrangement is such that the drum is rotated slower than the sleeve 56. The gears are always in mesh, as shown in Fig. 4. When the clutch member 50 is withdrawn from the clutch teeth 48 by reason of the shifting of the bar 35 to an extreme right hand position, the drum starts rotating, makes a complete revolution and moves the spindle 12 rearwardly to disengage the tap and eject completed work therefrom (as will be hereinafter explained), and afterwards resets the bar 35 to its extreme left hand position, as shown in Fig. 1, carrying the new work into coaction with the tap. The latter operation will also be more fully explained.

The resetting of the bar 35 in positioning new work in the work holder H is accompanied by a replacement of the spindle 12 to the right by reason of the connections 40, 41, 43 above described, to condition the spindle to again drive the tap. The work holder mechanism shown in Figs. 1 to 9 will now be described.

Referring first to Fig. 2, T in this figure represents a suitable tap with thread cutting formations $t$ and a shank T′ formed to be gripped by a suitable chuck mechanism C. The tap is shown as in threaded engagement with four different pieces of work at W′, W2, W3 and W4 and is about to commence tapping a piece of work, designated W, but which will first be moved to the position of the piece at W′. The pieces of work W′ to W4 inclusive are within a work holding frame 60 mounted upon the top of the bracket 7. The transverse outline of the frame 60 is best shown in Figs. 6 and 7, wherein it will be seen that this frame comprises a hollow channel-shaped single casting with downwardly and outwardly extending flange-like projections 62. The projections 62 have their surfaces machined to rest on the bracket 7 and be held by suitable overhanging securing strips 63 rigidly attached to the bracket 7. Any suitable means may be provided, such as cap screws not shown, for holding the casting 60 against longitudinal movement relative to the bracket 7 and attaching members 63.

The channel-shaped upper portion of the frame 60 is covered by a cross plate or cap 65 secured as by cap screws 66 to the side walls of the channel formation. A portion of the work receiving member 10 is shown in Fig. 2 as containing the piece of work at W, and at the right of this piece of work is a bar 68 which is connected, as shown in Fig. 1, rigidly with the control bar 35 as by a connecting arm 69. The bar 68 retracts at certain periods from the position in which it is shown in Fig. 2 in order to allow new pieces of work to drop into the hollow interior of the work receiving member 10 as through a slot 10′ in the work receiving member, and on a return movement carries such piece of work toward the spindle to the work position W′ pushing the tap leftward ahead of it as well.

While it is not, in general, essential to the mechanism comprising my invention, the pieces of work at W2 and W3 act as lead screws to cause the tap to start tapping a piece of work at W′, and after this piece is tapped, to cause the tap to push on the feed bar 68 and cause the extreme right hand shifting of the main control bar 35, thus actuating the clutch mechanism 47—52 to start a new tapping cycle.

Near its right hand end (all longitudinal sections) the work holder frame has lateral bores 70 which receive beveled nose plungers 71. These are normally held in the position shown in Fig. 2 for the purpose of holding the blank at W′ against retreating from the tap. The plungers are pressed toward each other by springs 72 reacting inwardly toward the tap on the plungers and outwardly on restricted portions 73 of the frame in which the stems of the plungers slide. The plungers have their inner ends projecting through suitable openings in a hollow rectangular fitting 75 suitably secured in the interior of the frame 60 in any convenient manner. Next adjacent the fitting 75 and to the left of it, as shown, is a hollow rectangular work engaging and holding member 76. Inwardly extending ribs 76′ on the member 76 directly engage the nut in position at W1 and hold the nut in this position against any substantial lateral movement with reference to the spindle axis.

To hold the other blanks against turning, while on the tap, the frame 60 carries a plurality of hollow work engaging rectangular members 80, see particularly Fig. 8. These members 80 are spaced and partly guided for lateral movement by rectangular spacer blocks or plates 81, the character of each of which is substantially as shown in Fig. 9. The spacer plates are open toward the bottom of the machine as at 83 and these openings face toward a slot 84 cut into the bottom of the channel formation of the frame 60 so as to discharge chips, cut by the tap, toward the bed of the machine.

In order that the blanks in the various position shown in the work holder may threadingly embrace the tap, without strain on the tap in case of eccentricity of the tapped apertures, each of the members 80 may slide horizontally within the work holding frame by reason of clearance shown at 85 at both vertical side edges of each of the members 80. The blanks may of themselves slide vertically, being guided by their flat sides as shown in Fig. 6 against the ribs 80′, and there being clearance above and below each blank as at 80″, Fig. 6. It will thus be seen that the necessary horizontal as well as vertical movement of the blanks to compensate for all tolerable inaccuracies in the blanks, with respect to eccentricity of the apertures, is provided for without loose play in more than one right line direction between any two adjacent surfaces of the relatively movable members. The blanks are moreover held very firmly against turning relative to the holder frame 60, thus minimizing tool chatter and preventing the blanks from binding by partial turning. The position of the aperture axis of the blank at W′ determines the working axis of the tap, the shank of which may pivot slightly within the driving chuck, and the other blanks move laterally so that their aperture axes are all coincident.

In order that pieces of work previously tapped, but still embracing the tap will act as lead screws on the tap to advance it to cause it to start tapping a new blank, and also to provide for holding a predetermined spaced relationship of blanks on the threads of the tap, I provide plungers at 90 which are guidingly supported in bores 91 in the frame 60, and which are normally pressed inwardly by springs 92 reacting inwardly on the plungers, as shown. The ends of the plungers project between adjacent blanks, being guided in suitable recesses formed in the members 80 and 81.

The plungers are withdrawn periodically from engagement with the blanks by a slotted arm 93 secured to a rock shaft 94 (see Fig. 1) which is operated by a cam on the drum 30. The rock shaft 94 has an arm 95, the free end of which is raised by a cam 95a on the drum (see Fig. 4) to raise the plungers 90 by lifting against adjustable nuts 96 on the plunger shanks.

During the tapping of the blank at W′, the plungers have been holding the blanks at W2 and W3 by bearing against the ends thereof toward the spindle, but, with the plungers withdrawn, the bar 68 as now moved by one of the cams on the drum 30 may slide the tap to the left while inserting the new work. As the bar inserts new work into the holder the new work pushes the tap a sufficient distance to carry each blank one step to the left, always maintaining each blank which is on the tap threads, in engagement with two members 80. The spacing of the blanks on the tap threads by the above mechanism prevents any two adjacent blanks from engaging the same member 80, the advantage of which is obvious.

The tap engaging chuck C, as previously stated, is fixed on the right hand end of the spindle shaft 16. The chuck includes a suitable collet head 97, the interior of which is not shown, but which may be substantially in accordance with the disclosure of the Kelleher patent above referred to. The collet carries a non-rotating arm member 98 which partly embraces the bar 35 at 98′, and which has a hollow hub-like member freely embracing the collet at a circular recess therein, designated 99.

Suitable means for ejecting pieces of work from the tap shank may comprise one or more pivoted ejector fingers such as 101 (Fig. 3) secured to a bracket-like extension 102 of the arm 98. The finger is normally held in the position shown in Fig. 3 by reason of a tension spring 103, and the finger ejects tapped blanks from the tap shank while the collet and spindle move to the left, as shown in Fig. 3, as will be obvious.

In Figs. 10 to 17 inclusive I have shown a modified construction of work holder, particularly adapted for cylindrical blanks. The main holding frame is indicated in these figures at 60a and this frame may be shiftable in a horizontal plane by reason of clearance as at 105 with the bracket 7 and overhanging members 106 forming, in effect, a dovetail slide for the frame 60a.

Within the frame 60a, I show a substantially fixed work holding block 110 and a movable work holding block 111. It is desirable that only one of these blocks be allowed to shift laterally in the holder 60a because by reason of this, at least one piece of work will be held very firmly and thus determine the position of the tap axis during the tapping operation. Thus, the pieces of work in the two blocks may have their openings eccentric to each other, and the tap will nevertheless not be subjected to side strain.

The block 110 bears tightly on all sides against adjacent surfaces of the block 60a, and cover plate 65a surmounting the frame 60a. Endwise movement of the block 110 to the left, as shown in Fig. 10 for example, is prevented by the frame closure member 115.

The block 111 is clear of all adjacent laterally disposed interior surfaces of the frame 60a, but is comparatively close to the inner surfaces of the side and bottom walls of the frame and to the under surfaces of the cover plate along horizontal and vertical planes respectively intersecting the tap axis. The general shape of the movable block 111 is shown best in Fig. 16. This block has side channels at 111′ for engagement by pins 114 extending loosely into the channels centrally of the block, the pins being rigidly supported in horizontal bores in the side walls of the frame 60a. It will be obvious from inspection of Figs. 12 and 16 that by the arrangement shown the block 111 may turn slightly as well as shift either horizontally or vertically a slight distance. Thus, in the event the piece of work at W1 (Fig. 10) has its opening eccentric to the opening in the piece of work at W2 (Fig. 10) and the exterior surface of the blank at W1 substantially fits the central opening in the block 111, this block 111 will simply shift laterally to bring the aperture of the blank at W′ into true alignment with the aperture of the blank at W2. The blocks 110 and 111 are provided with work gripping jaws 120 and 125, the latter being arranged to move with the block 111, as will be hereinafter explained.

In order to reduce friction, tending to hold the block 111 and its jaw 125, against lateral shifting, I provide an anti-friction device which is as follows: The end of the frame 60a, remote from the spindle, carries an end closure plate 116, apertured at 116' to receive new work into the holder. The plate may be held onto the frame by suitable screws 117. The inner face of the plate 116 has a horizontal groove 116''. The end of the block 111 adjacent the plate 116 has vertical grooves at 111''. Riding in the respective grooves are rolling elements shown as balls 118. The balls are held by a suitable retainer plate 119 loosely disposed in the space between the plate 116 and block 111, this retainer plate being allowed to shift in all directions by reason of clearance at all its peripheral edges. The plate 119 has horizontal slots at 119' receiving the balls which ride in the horizontal grooves 116'', and vertically disposed slots 119'' which receive the balls riding in the vertical grooves 111''. By this means any tendency for the block 111, which holds the blank from the time the tap starts operating on it until it is completely tapped, to drag in moving to position laterally of the tap axis, is minimized. The force initially exerted by the tap in entering the blank held between the block 111 and jaw 125 is of course toward the balls 118.

The work gripping jaws 120 and 125, which co-operate with the blocks 110 and 111 to hold the cylindrical blanks against turning movement relative to the frame 60a, are rectangular in cross section and extend into fitting rectangular bores 121 and 126 in the respective blocks. The jaw 125 is supported substantially entirely by the block 111. The bores 121 and 126 intersect the horizontal bores in the blocks 110 and 111 for the tap and work. The upper ends of the jaws extend through suitable openings in the cover plate 65a and have overhanging projections 122 which are engaged by a cam bar 123, the latter being slidable in a suitable channel in the top of the plate 65a. The bar 123 has cam notches at 128 and 129 for engaging respective projections 122 to raise the jaws and release the work at the end of each tapping cycle. Each of the jaws are normally pressed downwardly by suitable springs 130 reacting against an overhanging bracket 132 secured to the cover plate 65a. Both jaws have beveled serrated work gripping surfaces adjacent the work in the respective blocks as indicated at 133. During tapping, these serrated surfaces are pressed into biting engagement with the adjacent surfaces of the blanks by reason of the springs 130.

It will be understood that the blanks are shifted from the position shown in Fig. 10, so that the blank in position at W1 assumes the position of the blank at W2, by a shifting movement of the tap, as described in connection with Figs. 1 to 9. A bar 68 is shown in Fig. 10 as engaging a blank at position W preparatory to shifting the work and tap. When the control bar 35 is shifted to thus reposition the tap and feed new work, the jaw members 120 and 125 are raised by the cam notches 128 and 129, and the means for causing the necessary longitudinal movement of the cam bar may comprise a rigid connecting arm 135 between the control bar 35 and the cam bar 123.

From the above description, it will be seen that whenever a blank at W1 has an eccentric aperture, the oncoming tap point will cause the lateral shifting of the block 111 either vertically or horizontally, depending on the direction of eccentricity, and as the block 111 shifts to thus bring the opening in the blank into alignment with the tap which is held on a fixed axis by the chuck C and the blank at W2, the jaw 125 moves with it, the necessary lateral motion being comparatively unrestrained by frictional drag due to the bearing arrangements including the plate 119 and the balls 118. The frame 60a does not shift except in cases of excessive eccentricity of the blank aperture at W2, but then it may by reason of the clearance at 105, Figs. 11 and 12.

In Figs. 18 to 24, I show still another modification, particularly adapted for holding hexagonal work blanks. In these figures, the blanks are shown as arranged in pairs as though fed by a feeding mechanism such as shown in Patent Number 1,784,631, issued to Daniel Kelleher, December 9th, 1930, although it is to be understood that any feeding arrangement that will feed two blanks at a time may be used. In this construction, the main work holding frame 60b is shown as internally recessed, and the recess covered by a top plate 65b. The work engaging members which are shiftable within the work holding frame comprise two essentially similar sets of mechanisms, designated generally 140, a pivoted work engaging member 141 and a vertically floating work engaging member 142.

Each of the mechanisms 140 comprises a rectangular frame including a main body portion 145 and a rigidly attached plate 146. Each body member 145 is centrally apertured as at 147 to receive a nut blank, and the apertures are extended horizontally to allow horizontal lateral floating movement of a piece of work as at W1 within the confines of the apertures 147. The plates 146 are likewise apertured to allow the nut blanks to pass through the entire mechanisms 140.

Slidably mounted in an inclined channel slideway 150 in each body member 145 is a clamping bar 151, the bar having a horizontal bottom surface at 152 for engaging the upper flat side of the nut blank. The bars 151 are normally urged to the right (Figs. 22 and 23) along the inclined channel as by reason of respective spring pressed plungers 153 reacting at one end on the wall of the frame 60b.

The springs 154, as shown, are within suitable bores in the clamping bars 151, which bores also guide the plungers. On the wall of the frame 60b, opposite that engaged by the plungers 153, is an enlargement 155, which slidably supports a suitable cam bar 156. The purpose of the cam bar is to withdraw the surface 152 of the blank gripping bars 151 from engagement with the respective nut blanks in position at W1. This is accomplished by means of providing sliding pins 157 in suitable bores in the enlargement 155. The pins bear at their inner ends on the end surfaces of the clamping bars 151, and have their outer ends arranged to engage cam notches 159 and 160 in the cam bar 156. The cam bar is actuated by reason of a connecting member 161 between it and the main control bar 35 of the tapping machine. As shown, the connecting member 161 slides on the cam bar 156 and because of excessive movement of the bar 35, operates only at the ends of the bar 35 by engaging fixed collars 163 and 164 on the cam bar 156. The relation of the notches 159 and 160 to the respective pins 157 controlling the release of the work clamping bars 151 is such that these bars are moved away from the work simultaneously and are simultaneously released to grip new pieces of work.

The mechanisms 140 may each slide vertically in their guideways which are formed in part by an end closure member 170 and blocks 171 within the holder frame 60b. The plate 170 is provided with beveled nose spring pressed plungers 173 (see Fig. 19) which hold the two blanks at W1 in the holder against moving to the right, as shown in Fig. 19, when the tap advances to start tapping the blank which is nearest the tap, as shown. This plunger arrangement is essentially similar to the arrangement shown in Fig. 2, hence, this will not be described in detail.

It will be noted that the clamping bars 151 have limited movement to the right by abutting the wall of the frame 60b, hence, the clamping surfaces 152 bear against the flat top side of the blanks with only sufficient force to prevent turning of the blanks, but at the same time permitting the blanks to slide bodily horizontally to bring the blank apertures into horizontal alignment with the tap. The springs 154 are only sufficiently strong to hold the surfaces 152 in contact with the blanks.

The blocks 171 form supports for the pivoted work engaging member 141 previously mentioned. This work engaging member, the general shape of which is shown best in Fig. 21 is trunnioned on rigid pins 180 which enter suitable openings in the blocks 171. The member 141 has a rectangular blank receiving opening at 181 which receives the two blanks at W2 which have just been tapped, and which holds the blanks against rotation while in this position. In order that the blanks at W2 may have their outer surfaces out of alignment as by reason of eccentricity of the tapped apertures, the recess 181 has clearance on all sides for the blanks. The relative position of two blanks at W2 in Fig. 18 is exaggerated to illustrate the purpose of the arrangement, and it will be seen that the member 141 turns to allow the blanks to be held against rotation relative to the tap, one blank being seen in a higher horizontal plane than the other. Likewise, the member 141 provides for offsetting of the blanks at W2 horizontally, as shown in Fig. 19, the rectangular recess 181 being long enough in a direction transversely of the machine to allow the exaggerated offset of these nut blanks at W2 shown in Fig. 19. Suitable fixed pins, such as 190, Fig. 20, enter slots 191 in the ends of the members 141 to prevent excessive pivotal movement of the member 141. As shown in Fig. 18, the tap threads stop short of entering the tapped blanks at W3, but in the event that the right hand blank (Fig. 18) is still on tap threads at the time it is shifted to the W3 position, this right hand blank may shift in the rectangular opening 185 of the member 142, while the member 142 may shift in a plane normal to the first shifting as by reason of end clearance between the top and bottom surfaces of the member 142 and the frame. This clearance is indicated at 186.

All the mechanisms described in connection with Figs. 18 to 24 are held in place by the end closure member 170 at one end of the holder and a block 187 which forms the closure for the holder at the other end. The block 187 may be held by through pins 188 entering the block and side walls of the frame 60b.

The arrangement just described is particularly adapted for tapping small nut blanks and no specific arrangement is shown for preventing longitudinal movement of blanks at W2, other than natural friction, whereby these blanks at W2 may act as lead screws for feeding the tap. It will be understood that in connection with small nuts, this lead screw action on part of previously tapped nuts is not particularly essential. The spring 145 (see Fig. 1) is normally compressed when the tap is rotated, and this compression is maintained until both nuts at W1 are in practically complete threaded engagement with the threads of the tap.

I claim:

1. In a tapping machine wherein the tap is in threaded engagement with a plurality of blanks, at one time, means to fixedly hold one of the blanks against lateral and turning movement, and means to intimately embrace and hold another blank against turning while permitting lateral movement thereof in any direction.

2. In a metal cutting machine wherein the work is machined by relative rotational and axial movement between the tool and work, means to hold one piece of work against turning and on a fixed axis, and means to hold another piece of work against turning while guiding it to float laterally of its axis, whereby the tool may operatively engage both pieces of work at the same time without being subjected to side strain in the event of nonuniformity of the pieces.

3. In a tapping machine wherein the tap is in threaded engagement with a plurality of blanks at one time, means to hold the tap for rotation on a fixed axis during a complete tapping operation on a single blank, and means to guidingly hold blanks for lateral movement in intersecting planes relative to the tap axis, while preventing turning of the held blanks.

4. In mechanism of the class described, a work holder wherein there is means to guide and hold a plurality of pieces of work for free and independent relative lateral movement in any direction, a tool support adapted to be driven on a fixed axis and a tool arranged to act on the work in the holder and having a driving connection with the support, permitting the blank to adjust itself to the tool in various laterally moved positions in the holder.

5. In a metal cutting machine, a work holder for a series of hollow blanks to be internally machined, and means for machining the blanks, said holder comprising a frame and a plurality of laterally shiftable members arranged to engage individual blanks and hold the same against turning relative to the frame, said members arranged for unrestricted lateral movement over a limited distance, means on the frame to prevent longitudinal movement of the work engaging members, and a cutting tool adapted to simultaneously and operatively engage a plurality of blanks in the work holder.

6. In a metal cutting machine, a work holder for a series of substantially aligned work blanks, and means for performing a cutting operation on the blanks successively, said work holder comprising a frame and a plurality of rigid individually and laterally slidable blank engaging members non-rotatably arranged on the frame, each of said members embracing a respective blank and being positioned thereby in such manner that each blank shall have a part thereof in true alignment with a corresponding part of the other blanks, irrespective of non-alignment of other parts of the blanks.

7. In a machine of the character described, a work holder for a series of flat-sided work blanks adapted to be internally threaded, a tap adapted to be threaded through a plurality of such blanks while in the holder, and individual blank holding members shiftable in the holder transversely of the holder, each member contacting with a blank along opposite flat sides thereof, and said blanks being slidable within said holding members in planes parallel to such opposite sides, whereby the blanks will be held against turning movement relative to the holder, and the tap will not be subjected to side strain while in the embrace of several non-uniform blanks in the holder.

8. In a tapping machine for hexagonal apertured blanks, a work holder and tap, and means to operatively turn the tap relative to the holder, blank positioning means in the holder arranged to engage opposite flat sides of a blank and guide the blank therein for lateral movement relative to the positioning means and in a plane normal to the tap axis, while preventing rotation of the blank, said positioning means being slidable within the holder in a direction transverse to the aforesaid sliding movement of the blank, whereby the tap may determine the position of each blank aperture axis while in the holder without side strain on the tap.

9. In a tapping machine a work holder and a tap adapted to enter the holder in threaded engagement with a series of work blanks, a series of individually and laterally shiftable but longitudinally spaced and fixed work engaging members mounted in the holder, each arranged to embrace and hold a blank against turning movement relative to the frame and holder, whereby the tap may turn on a fixed axis irrespective of irregularities in the blanks.

10. In a metal cutting machine, a work holder, a cutting tool adapted to enter the holder and engage a series of blanks in the holder, means in the holder to retain one of the blanks against turning and against lateral movement in any direction, and additional means in the holder to engage another blank and prevent turning of the same while guiding it for substantially free lateral right line movement in intersecting planes.

11. In a metal cutting machine, a holder for work, a cutting tool and means to effect relative rotational and longitudinal movement between the work holder and tool to machine the work, said holder comprising a frame and a plurality of work engaging members in the frame arranged to shift laterally of the frame while holding a respective piece of work against turning movement relative to the frame, and means to guide the pieces of work for shifting movement relative to the shifting movement of said work engaging members and laterally of the tool axis, whereby the tool may operatively engage a plurality of pieces of non-uniform work without lateral strain on the tool.

12. In a tapping machine, a holder for work, a tap arranged to enter the holder, and means to effect relative rotational and longitudinal movement between the tap and holder to cut threads on work in the holder, a plurality of relatively and laterally shiftable work holding members in the holder through which each blank passes successively, each arranged to hold a blank against turning relative to the holder, and means to cause adjacent work blanks to remain longitudinally spaced in the holder, during the aforesaid rotational movement, in such manner that no two pieces of work shall engage the same work holding member at one time.

13. In a tapping machine for apertured blanks, a holder for work, a tap arranged to enter the holder, and means to effect relative rotational and longitudinal movement between the tap and holder to cut threads on blanks in the holder, said holder comprising a frame providing lateral guideways therein and a plurality of individually and laterally movable blank engaging members supported for movement in the guideways and prevented from rotational movement relative to the frame thereby, and through which each blank passes successively, and means to cause work blanks to be spaced in the holder in such manner that no two pieces of work shall engage the same work engaging member at one time, whereby adjacent blanks may vary in shape relative to the aperture axes thereof without subjecting the tap to side strain.

14. In a tapping machine, a tap and means to actuate the same to cut threads, a work holder adapted to receive a plurality of work blanks, relatively and laterally floating members arranged to hold the blanks to prevent turning thereof relative to the holder and through which each piece of work passes successively, and means to space the blanks in the holder in such manner that no two such blanks will be engaged by a single work engaging member at one time.

15. In mechanism of the class described, a rotatable cutting tool, a work holder, relatively and laterally shiftable work engaging members in the holder arranged to prevent turning of the work relative to the holder, and a series of longitudinally fixed members acting as spacers for the work engaging members, the spacers being open at one side to allow chips to move clear of the work.

16. In a tapping machine, a tap, a holder for work blanks to be tapped, comprising a frame and alternately positioned work engaging members, and spacing members for the work engaging members in the holder, means to hold the said members against longitudinal movement while permitting the work embracing members to float relative to each other transversely of the tap axis, and channels in the spacing members for guiding chips clear of the work.

17. In a tapping machine wherein the tapping cycle comprising tapping a piece in a given position, moving the tapped piece from this position and then presenting a new piece, is under the control of a master control member, a holder comprising a main frame, a work gripper movably supported and guided by the frame for lateral free floating movement relative to the frame, and means operatively connecting the master control member and gripper in such manner that the connections operate irrespective of relative lateral movement between the gripper and control member.

18. In mechanism of the kind described, a work holder, a tool adapted to enter the work holder, means to effect relative turning movement between the holder and tool about the axis of the tool, and a work engaging member arranged to prevent rotational movement of the work relative to the frame, said member being pivotally connected with the frame on an axis transverse to the axis of the tool, and being arranged to engage a plurality of pieces of work at the same time.

19. In a metal cutting machine arranged to operate on the internal surfaces of blanks of substantially the same size and having variations in the location of their internal surfaces relative to their external surfaces, a work holder, said work holder comprising a frame and a plurality of relatively and laterally floating work engaging members through which the blanks pass and arranged to hold the work against turning, means to support said members in longitudinally fixed relation to said holder, said members being positioned laterally of the holder by the blanks, and wherein each member is arranged to hold the internal surfaces of the blanks in true alignment with each other, irrespective of the non-alignment of the external surfaces of the blanks.

20. In a tapping machine arranged to simultaneously operate on the internal surfaces of a plurality of blanks of substantially the same size and having their internal surfaces varying in location relative to their respective external surfaces, the combination with a frame, of means carried by the frame to prevent the rotation of a plurality of pieces of work and permit such pieces of work to freely shift bodily and independently in any direction in planes normal to the axis of the internal surfaces to align the openings in the work.

21. In a metal cutting machine wherein the work is machined by relative rotational and axial movement between the tool and the work, a workholder comprising a fixed frame having a guideway, the axis of which guideway is parallel with the axis of the tool and through which the tool extends, a series of non-interconnected workholder units, each unit comprising a plate-like member slidably mounted for independent transverse movement in said guideway and provided with an opening through which the work passes, means to restrain the units against movement along the axis of the guideway, and wherein the walls of each unit adjacent the opening therein is tapered to facilitate entrance of work and cause the unit to be moved laterally in the guideway.

22. In a tapping machine for work having openings therethrough, the axis of which varies from the axis of the body of the work and wherein the tap is arranged to operate on a plurality of pieces of work simultaneously, the combination with a work holding means to prevent rotation and movement in a plane normal to the axis of the tap, of a second work holder to prevent rotation of another piece of work but permit the movement of such last-named work in any direction in a plane normal to the axis of the tap, and means to progress the work through each of said workholding means in succession, whereby the first means aligns the axis of the tap and the second named workholding means aligns the opening in the work with the axis of the tap.

23. In a tapping machine having a rotating tap arranged to simultaneously operate on a plurality of pieces of work, a workholder frame, means carried by said frame to hold one piece of work against rotation and movement in a plane normal to the axis of the tap and thereby locate such axis, a series of plate-like members having openings therethrough, means to progress the work through the openings in each of said members, wherein said members are mounted to permit their unrestricted movement for a limited distance transverse of the guideway, said members being arranged to embrace the work to restrict relative movement between the work and said members in a direction parallel to the direction of the movement of said members in the guideway and wherein said members are arranged to permit relative movement between the members and the work in a direction transverse of the guideway and normal to the direction of the movement between the members and the guideway.

BERNARD P. SCHILTZ.